US012754325B2

(12) United States Patent
Kumar et al.

(10) Patent No.: US 12,754,325 B2
(45) Date of Patent: Oct. 6, 2026

(54) GNSS SPOOFING DETECTION AND ALERT USING SBAS SATELLITES

(71) Applicant: Honeywell International Inc., Charlotte, NC (US)

(72) Inventors: Perumal Kumar, Bangalore (IN); Sanjay Lenka, Bangalore (IN)

(73) Assignee: Honeywell Aerospace US LLC, Phoenix, AZ (US)

( * ) Notice: Subject to any disclaimer, the term of this patent is extended or adjusted under 35 U.S.C. 154(b) by 341 days.

(21) Appl. No.: 18/460,326

(22) Filed: Sep. 1, 2023

(65) Prior Publication Data

US 2025/0028060 A1 Jan. 23, 2025

(30) Foreign Application Priority Data

Jul. 19, 2023 (IN) ............................. 202311048573

(51) Int. Cl.
*G01S 19/21* (2010.01)
*G01S 19/27* (2010.01)

(52) U.S. Cl.
CPC ............ *G01S 19/215* (2013.01); *G01S 19/27* (2013.01)

(58) Field of Classification Search
CPC ................................ G01S 19/215; G01S 19/27
(Continued)

(56) References Cited

U.S. PATENT DOCUMENTS 9,453,903 B2 9/2016 Robinson
9,664,794 B2 5/2017 Hwang et al.
(Continued)

FOREIGN PATENT DOCUMENTS

CN 112147645 A 12/2020
CN 114966765 A 8/2022
(Continued)

OTHER PUBLICATIONS

European Patent Office, "Extended European Search Report", dated Jan. 2, 2025, from European Application No. 24184321.8, from Foreign Counterpart to U.S. Appl. No. 18/460,326, pp. 1 through 7, Published: EP.

(Continued)

*Primary Examiner* — Samarina Makhdoom
(74) *Attorney, Agent, or Firm* — Fogg & Powers LLC

(57) ABSTRACT

A method for detecting spoofing comprises monitoring signals from GNSS and SBAS satellites with a GNSS receiver; obtaining current time and orbital parameters from the receiver, based on real-time signals from the satellites; computing orbital positions based on the current time and orbital parameters; retrieving past orbital parameters; calculating predicted orbital positions based on the orbital parameters with respect to current time and the past orbital parameters; computing current orbital positions based on current satellite signals; determining a first distance value between two or more of the satellites based on the predicted orbital positions; determining a second distance value between two or more of the satellites based on the current orbital positions; comparing the first and second distance values to obtain a discriminator value; determining whether the discriminator value is greater than a threshold level, and outputting a spoofing alert when the discriminator value is greater than the threshold level.

19 Claims, 4 Drawing Sheets

(58) Field of Classification Search
USPC .......................................................... 342/350
See application file for complete search history.

(56) References Cited

U.S. PATENT DOCUMENTS

| | | | | |
|---|---|---|---|---|
| 10,094,930 | B2 | 10/2018 | Schipper et al. | |
| 11,442,174 | B2 | 9/2022 | Cao et al. | |
| 11,480,689 | B2 | 10/2022 | Schwindt | |
| 2010/0283681 | A1* | 11/2010 | Remondi | G01S 19/05 342/357.66 |
| 2015/0226858 | A1* | 8/2015 | Leibner | H04K 3/90 342/357.59 |
| 2016/0370471 | A1 | 12/2016 | Mabuchi et al. | |
| 2016/0377726 | A1* | 12/2016 | Schipper | G01S 19/215 342/357.59 |
| 2018/0172797 | A1* | 6/2018 | Hauswald | G01S 13/781 |
| 2021/0109231 | A1* | 4/2021 | Söderholm | G01S 19/396 |
| 2021/0333411 | A1* | 10/2021 | Gum | G01S 19/21 |
| 2022/0082704 | A1* | 3/2022 | Lemke | G01S 19/243 |

FOREIGN PATENT DOCUMENTS

| | | | |
|---|---|---|---|
| EP | 3805798 | A1 | 4/2021 |
| KR | 101963580 | B1 | 3/2019 |
| KR | 102350194 | B1 | 1/2022 |
| WO | 2018116141 | A1 | 6/2018 |
| WO | 2019162839 | A1 | 8/2019 |
| WO | 2021091414 | A1 | 5/2021 |

OTHER PUBLICATIONS

Lytvyn et al., "How can an Orbit Prediction Module speed up the TTFF and help to authenticate the position?", Satellite Navigation Technologies and European Workshop on GNSS Signals and Signal Processing (NAVITEC), 2012 6th ESA Workshop on IEEE., Dec. 5, 2012, pp. 1 through 6.

Fernandez, "Performance Based Navigation (PBN) National Airspace System (NAS) Navigation Strategy 2016-2030", Presented to Aeronautical Charting forum, Apr. 27, 2016, pp. 1 through 15.

U.S. Department of Transportation Federal Aviation Administration, "Performance Based Navigation PBN NAS Navigation Strategy 2016", FAA paper dated Feb. 12, 2016, pp. Cover through 35.

Kumar et al., "GNSS Spoofing Threat Detection and Corrective Action", U.S. Appl. No. 18/048,636, filed Oct. 21, 2022, pp. 1 through 25, Published: US.

* cited by examiner

GNSS SPOOFING DETECTION AND ALERT USING SBAS SATELLITES

CROSS-REFERENCE TO RELATED APPLICATION

This application claims priority to Indian Provisional Patent Application No. 202311048573 filed on Jul. 19, 2023, the contents of which are incorporated herein by reference in their entirety.

BACKGROUND

Global navigation satellite system (GNSS) spoofing results in the incorrect annunciation of actual GNSS receiver position outputs for a vehicle such as an aircraft, thereby resulting in potential hazards to avionics safety. The GNSS receivers typically have a 24 channel receiver design and face challenges due to spoofing threats, which leads the GNSS receivers to output erroneous position outputs. This potential hazard can result in aircraft being off track during flight, or can be catastrophic during an aircraft landing approach.

The GNSS receiver outputs are consumed by multiple aircraft systems such as the Automatic Dependent Surveillance-Broadcast (ADS-B), the Enhanced Ground Proximity Warning System (EGPWS), the terrain awareness and warning system (TAWS), flight control systems, and the like. Also, the required navigation performance (RNP) of an aircraft can be deteriorated due to spoofing events. Thus, any spoofing threats need to be detected to ensure that GNSS receivers are not susceptible to such spoofing threats.

SUMMARY

A method and system for detecting satellite signal spoofing are provided. The method comprises monitoring a plurality of satellite signals, from GNSS satellites and Satellite-based Augmentation System (SBAS) satellites, with a GNSS receiver; obtaining a current time and satellite orbital parameters from the GNSS receiver, based on real-time satellite signals received from the GNSS and SBAS satellites through a GNSS antenna; and computing satellite orbital positions for the GNSS and SBAS satellites based on the current time and satellite orbital parameters from the GNSS receiver. The method further comprises retrieving past satellite orbital parameters from the GNSS receiver stored in a memory; calculating predicted satellite orbital positions for the GNSS and SBAS satellites based on the satellite orbital parameters with respect to the current time, and the past satellite orbital parameters stored in the memory; and computing current satellite orbital positions for the GNSS and SBAS satellites based on current satellite signals from the GNSS and SBAS satellites received by the GNSS receiver. The method then determines at least one first distance value between two or more of the GNSS and/or SBAS satellites based on the predicted satellite orbital positions; determines at least one second distance value between two or more of the GNSS and/or SBAS satellites based on the current satellite orbital positions; and compares the at least one first distance value and the at least one second distance value to obtain at least one discriminator value. The method determines whether the at least one discriminator value is greater than a threshold level; and outputs a spoofing alert signal when the at least one discriminator value is greater than the threshold level.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
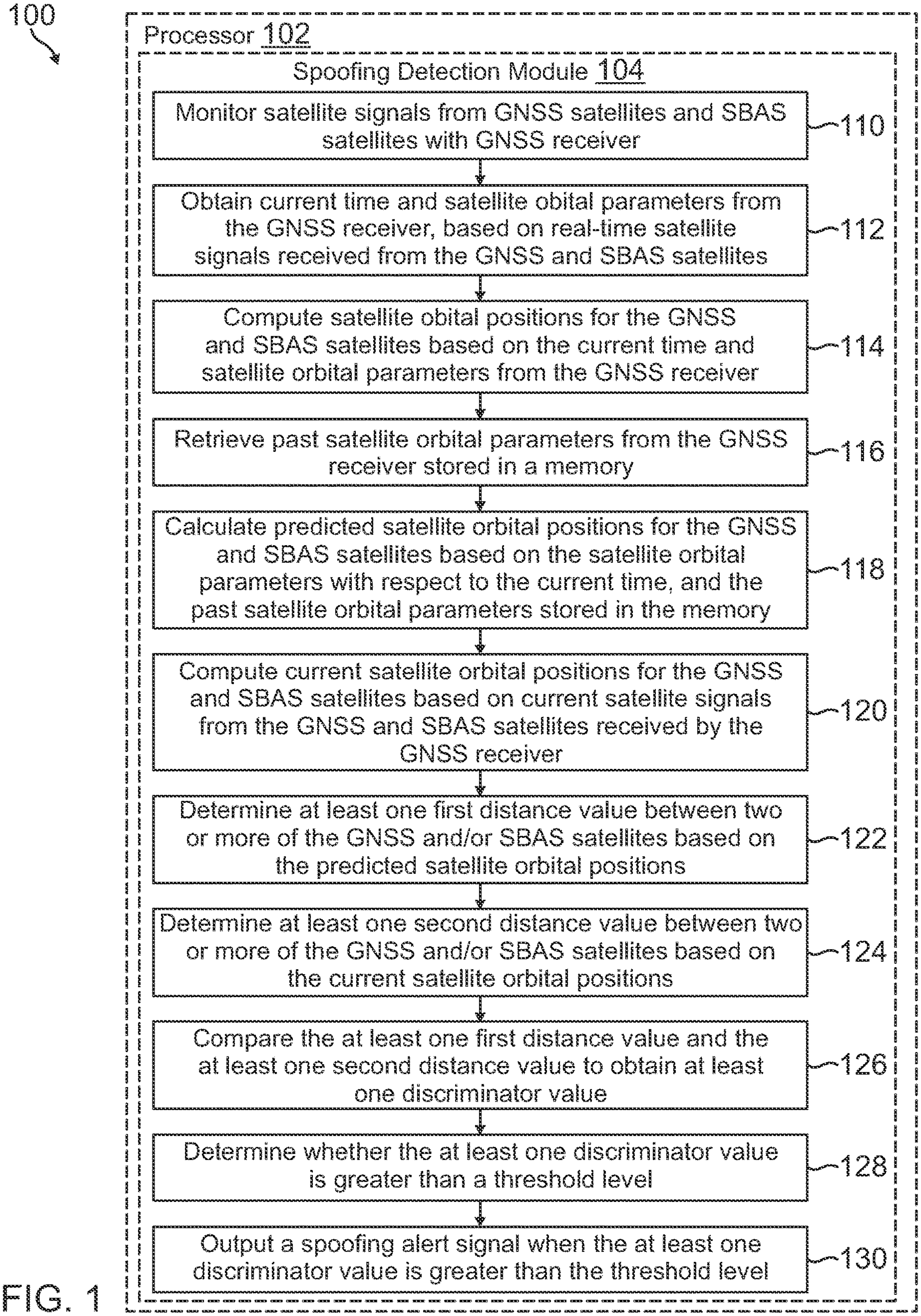
FIG. 1 is a block diagram of a system for satellite signal spoofing detection, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for implementing GNSS spoofing detection and alert using GNSS satellites and satellite-based augmentation system (SBAS) satellites are described herein.

The present methods provides for the detection and mitigation of spoofing threats to GNSS receivers, such as Global Positioning System (GPS) receivers. In addition, the present approach can be adapted for spoofing detection in other GNSS implementations, such as for GALILEO satellites, BEIDOU satellites, and GLONASS satellites.

The present approach can use various satellite distance computations based on the distance information between GNSS and SBAS satellites, or the distance information between a GNSS satellite and other GNSS satellites. When the GNSS receiver is a multi-constellation receiver, the distance information between GNSS satellites of different constellations can be used in various combinations to determine if spoofing is present.

The SBAS satellites are geostationary satellite systems that provide GNSS augmentation corrections. Examples of such satellite systems include Wide Area Augmentation System (WAAS) satellites, GPS-Aided GEO Augmented Navigation (GAGAN) satellites. European Geostationary Navigation Overlay Service (EGNOS) satellites, Multi-functional Satellite Augmentation System (MSAS) satellites, and System for Differential Corrections and Monitoring (SDCM) satellites. These satellite systems utilize reference stations, which are geographically distributed throughout the SBAS service area, receive GNSS signals and forward these signals to a master station. Since the locations of the reference stations are accurately known, the master station can accurately calculate wide-area corrections.

In general, the present spoofing detection and alert techniques compute the distance(s) of GNSS/SBAS satellites from SBAS/GNSS satellites, and this distance information can be used to compare with real time data to provide for spoofing detection. The spoofing detection can be done by computing the distance information of specific GNSS satellites with specific SBAS satellites, or a combination of GNSS satellites with other SBAS satellites where the distance can be computed. If spoofing exists, then the GNSS satellite(s) distance(s) computed pertaining to the SBAS satellites will vary with considerable margin, and thereby the spoofing can be detected and alerted.

In various embodiments, the present GNSS spoofing detection algorithms can be ported into a flight management system (FMS) of an aircraft, can be hosted in at least one GNSS receiver onboard a vehicle, or can be hosted in a standalone processor that is coupled to a GNSS receiver. In addition, the output of the spoofing detection can be displayed such as on a cockpit display, thus alerting a user such as a pilot so that corrective action can be taken.

The spoofing alert signal can be made available for broadcast to other users that are airborne or on the ground. Alerts can also be broadcast to ensure that other vehicle systems that host GNSS receivers, as well as regulatory authorities, are aware of the GNSS spoofing so that corrective actions can be taken. The broadcasted alerts can ensure safety as vehicles can avoid GNSS usage in vulnerable locations.

The present approach provides for improved navigation of various vehicles, such as land vehicles, aerial vehicles, and sea vehicles. In particular, the present techniques can be applied in various aircraft, such as a manned or unmanned aircraft. Example aircraft include airplanes, helicopters, unmanned aerial vehicles (UAVs), unmanned aircraft systems (UAS), urban air mobility (UAM) vehicles, drones, or the like.

Moreover, when the orbital information is computed using satellite data from other sources, such as retrieving data from the cloud, from GNSS receivers on other aircraft, or from ground stations such as through datalink, the actual position can be computed and thus seamless navigation and RNP can be assured.

Further details regarding the present system and method are described as follows and with reference to the drawings.

The SBAS satellites appear to be located at a fixed point in space when viewed from the earth's surface. As these geostationary satellites are located in a geosynchronous orbit and move in time with the rotation of the earth, the satellites appear motionless at a fixed position in the sky to ground observers. Geostationary satellites are placed in earth-orbit directly over the equator, and revolve in the same direction as the earth rotates (west to east), taking 24 hours to complete one rotation. Geostationary satellites are located approximately 22,237 miles above the earth's surface. Hence, the SBAS satellite orbital information can be easily computed with respect to time pertaining to earth's rotation, and can be available all the time for the GNSS receiver.

The performance of GNSS satellites can be improved by the use of regional SBAS satellites. The SBAS satellites can improve the accuracy and reliability of GNSS information by correcting signal measurement errors and by providing information about the accuracy, integrity, continuity, and availability of the GNSS signals. The SBAS satellites use GNSS measurements taken by accurately located reference stations deployed across a continent. The measured GNSS errors are transferred to a central computing center in a master station, where differential corrections and integrity messages are calculated. These calculations are then broadcast over the covered area using the SBAS satellites and serve as an augmentation, or overlay, to the original GNSS message.

The real-time orbital information of GNSS satellites is transmitted by these satellites in terms of navigation messages and are consumed by GNSS receivers for computing accurate position, velocity, and time. This orbital information can be spoofed and thereby the position computed and output by GNSS receivers can lead to misleading erroneous position information.

FIG. 1 illustrates a system 100 for GNSS satellite signal spoofing detection, according to one embodiment. The system 100 includes at least one processor 102, and a GNSS spoofing detection module 104 operatively coupled with processor 102. The processor 102 can be in a FMS of an aircraft, in a GNSS receiver, or can be a standalone processor, for example.

The spoofing detection module 104 includes instructions, executable by processor 102, to perform a method that comprises monitoring a plurality of satellite signals, from GNSS satellites and SBAS satellites, with a GNSS receiver (block 110). The method obtains a current time and satellite orbital parameters from the GNSS receiver, based on real-time satellite signals received from the GNSS and SBAS satellites through a GNSS antenna (block 112). The method computes satellite orbital positions for the GNSS and SBAS satellites based on the current time and satellite orbital parameters from the GNSS receiver (block 114); and retrieves past satellite orbital parameters from the GNSS receiver stored in a memory (block 116). The method calculates predicted satellite orbital positions for the GNSS and SBAS satellites based on the satellite orbital parameters with respect to the current time, and the past satellite orbital parameters stored in the memory (block 118). The method computes current satellite orbital positions for the GNSS and SBAS satellites based on current satellite signals from the GNSS and SBAS satellites received by the GNSS receiver (block 120).

The method then determines at least one first distance value between two or more of the GNSS and/or SBAS satellites based on the predicted satellite orbital positions (block 122); and determines at least one second distance value between two or more of the GNSS and/or SBAS satellites based on the current satellite orbital positions (block 124). For example, the at least one first distance value and the at least one second distance value can be determined by distance information comprising: distance information between one or more GNSS and SBAS satellites; distance information between a GNSS satellite and one or more other GNSS satellites; or distance information between multiple GNSS satellites of different constellations.

The method compares the at least one first distance value and the at least one second distance value to obtain at least one discriminator value (block 126); and determines whether the at least one discriminator value is greater than a threshold level (block 128). Outputting a spoofing alert signal occurs when the at least one discriminator value is greater than the threshold level (block 130).

The method can further determine whether the past satellite orbital parameters were updated at a time greater than a time period threshold. If the past satellite orbital parameters were updated at a time greater than the time period threshold, then the method collects real-time satellite orbital information for the GNSS and SBAS satellites from the GNSS receiver, and stores the real-time satellite orbital information in a memory.

Figure 2:
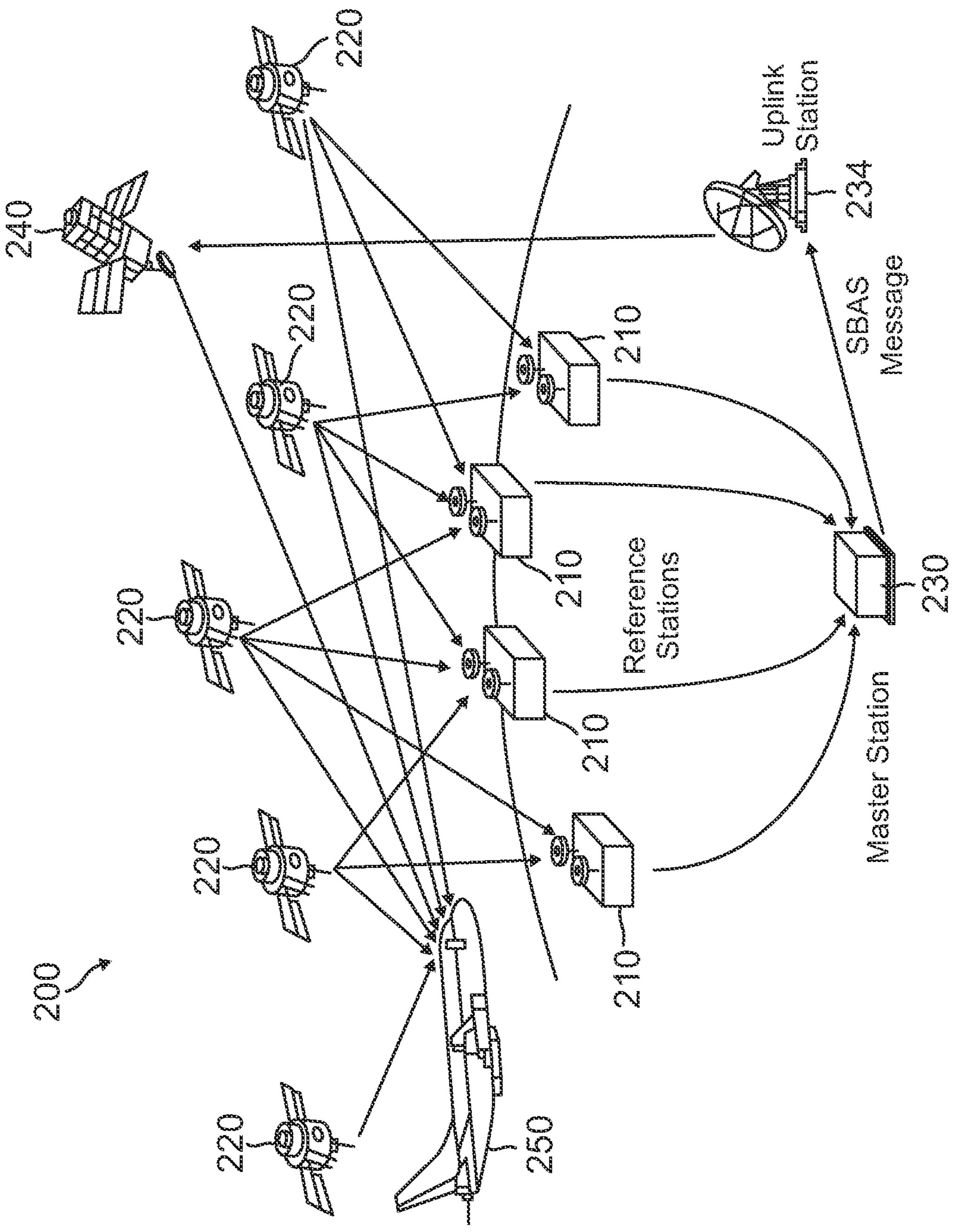
FIG. 2 is a schematic diagram of an example system, which can be used to implement satellite signal spoofing detection techniques, such as shown in FIG. 1.

FIG. 2 is a schematic diagram of an example system 200, which can be used to implement the present GNSS spoofing detection techniques, such as shown in FIG. 1. The system 200 includes a plurality of GNSS tracking reference stations 210, which can be ground-based. The tracking reference stations 210 have reference receivers that are configured to receive and decode real-time GNSS satellite orbital information from a plurality of GNSS satellites 220. The satellite orbital information can be received by tracking reference stations 210 through datalink communication services (e.g., very high frequency (VHF), Satcom, 5G, or the like).

A master station 230 is in operative communication with each of tracking reference stations 210. An uplink station 234 is in operative communication with master station 230. The uplink station 234 is configured to transmit uplink messages to a geo-stationary satellite 240, such as an SBAS satellite.

An aircraft 250 has a GNSS receiver configured to receive and decode satellite orbital data from GNSS satellites 220. The aircraft 250 is also in operative communication with geo-stationary satellite 240. As illustrated in FIG. 2, aircraft 250 can be a manned aircraft such as an airplane. Alternatively, other types of aerial vehicles with GNSS receivers can be used, such as helicopters, UAMs, UAVs, UAS vehicles, or the like.

In one embodiment, a spoofing detection engine and alert system is hosted by at least one processor onboard aircraft 250. The processing engine and alert system hosts the present GNSS spoofing detection algorithm, which is operative to detect GNSS spoofing events and to broadcast spoofing alerts. The GNSS and SBAS satellite(s) position is a function of GNSS time. The distance/range between GNSS satellites and SBAS satellites is also a function of GNSS time. The start data is stored in an ideal condition and subsequent data is stored and overwrites prior data with validation from the start data. Further details of the GNSS spoofing detection algorithm are described hereafter.

Various regulatory agencies, airlines, UAMs, UAVs, drones, and the like, can benefit from such spoofing detection and broadcasting of alerts. A flight path for an aircraft can also be planned based on this information.

Figure 3:
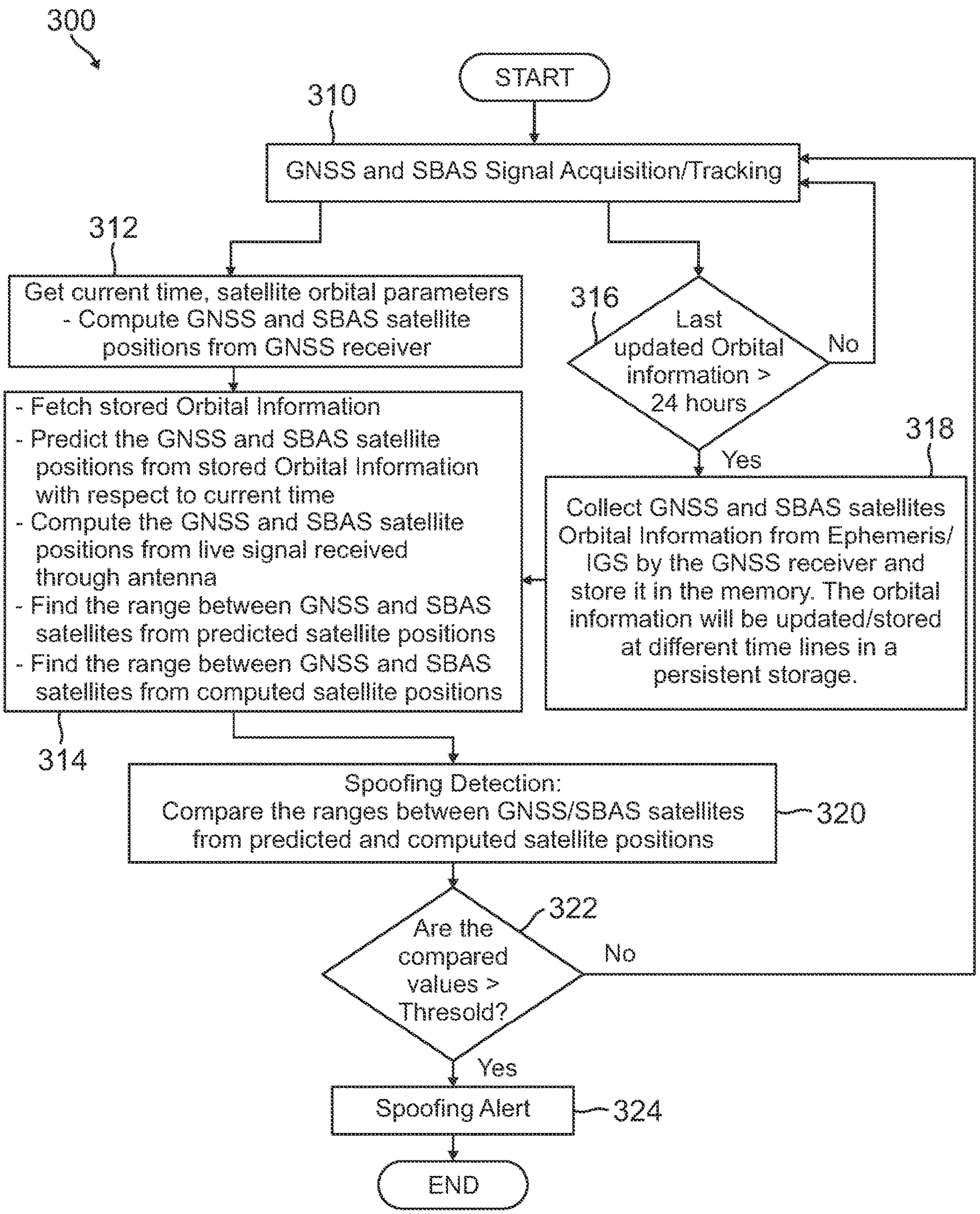
FIG. 3 is a flow diagram of a method for GNSS spoofing detection, according to an example implementation.

FIG. 3 is a flow diagram of a method 300 for GNSS spoofing detection, according to an example implementation. At the start, method 300 performs GNSS and SBAS signal acquisition and tracking (block 310), by monitoring GNSS and SBAS signals with a GNSS receiver. The method 300 gets a current time and satellite orbital parameters from the GNSS receiver, and computes GNSS and SBAS satellite positions based on the current time and satellite orbital parameters from the GNSS receiver (block 312). The method 300 then fetches stored orbital information; predicts the GNSS and SBAS satellite positions from the stored orbital information, with respect to the current time; computes current GNSS and SBAS satellite orbital positions from live signals received through a GNSS antenna; finds a range between two or more of the GNSS and/or SBAS satellites based on the predicted satellite positions; and finds a range between two or more of the GNSS and/or SBAS satellites based on the computed satellite positions (block 314).

During the GNSS signal acquisition and tracking (block 310), method 300 determines if the last updated orbital information was collected greater than 24 hours ago (block 316). If not, method 300 continues the GNSS signal acquisition and tracking at block 310. If the last updated orbital information was collected greater than 24 hours ago, then method 300 collects GNSS and SBAS satellite orbital information, such as from ephemeris or IGS (International GPS Service), from the GNSS receiver and stores the orbital information in memory (block 318). The orbital information can be updated and stored at different timelines (e.g., 1 to 7 days) in persistent and separate storage locations of the memory. This stored orbital information is made available to method 300 as described above (block 314). For example, past orbital information values can be retrieved from a cloud-based storage database.

The method 300 performs spoofing detection by comparing the range values between the GNSS/SBAS satellites (e.g., between GNSS and SBAS satellites, or between GNSS and GNSS satellites) from the predicted and computed satellite positions (block 320). The method 300 then determines if the compared range values are greater than a threshold (block 322). If not, spoofing is not detected and method 300 returns to the GNSS signal acquisition and tracking at block 310. If the compared values are greater than the threshold at block 322, then method 300 generates a spoofing alert (block 324), which can be sent to a cockpit display, for example, to notify an aircraft pilot of the spoofing detection.

Figure 4:
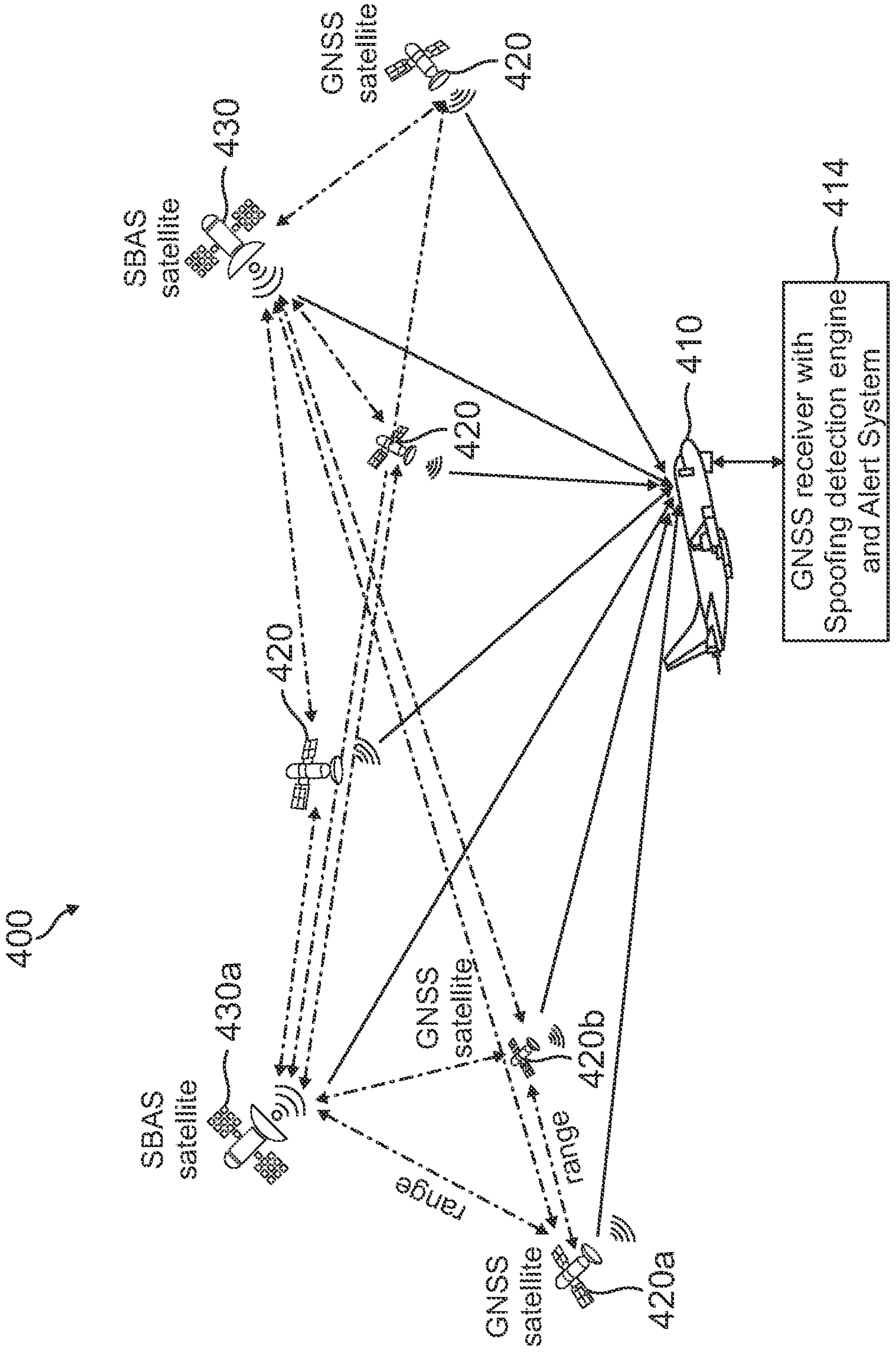
FIG. 4 is a schematic diagram of an example system, which can be implemented with a GNSS spoofing detection algorithm.

FIG. 4 is a schematic diagram of an example system 400, which can be implemented with the present GNSS spoofing detection algorithm. An aircraft 410 has an onboard GNSS receiver with a spoofing detection engine and alert system 414. The onboard GNSS receiver is configured to receive and decode satellite orbital data from a set of GNSS satellites 420. The aircraft 410 is also in operative communication with a set of SBAS satellites 430. As illustrated, aircraft 410 can be a crewed aircraft such as an airplane. The aircraft can be other types of aerial vehicles such as helicopters, UAM, UAVs, UAS vehicles, or the like.

As the SBAS satellites 430 are geo-stationary, their position is fixed and known in Earth-centered, Earth-fixed (ECEF) coordinates. The positions of GNSS satellites 420 (or any constellation of GNSS satellites) are a function of time and are known from the ephemeris stored previously. Thus, the positions do not change often, but updated information can be obtained from the ephemeris and can be verified from past data (e.g., 1-7 days data). The GNSS and SBAS satellite ephemeris are stored (e.g., 1-7 days).

The spoofing detection algorithm, which is hosted by spoofing detection engine and alert system 414, predicts the relative range between GNSS satellites and/or SBAS satellites with respect to the current time; and calculates the relative range between GNSS satellites and/or SBAS satellites from live signals. The spoofing detection algorithm compares the predicted and computed relative ranges between the GNSS satellites and/or the SBAS satellites; and provides a spoofing alert if the predicted relative range and the calculated relative range exceeds a predefined threshold.

In one example, a spoofing alert is output when a current computed distance (range) from a GNSS satellite 420*a* to an SBAS satellite 430*a* is greater than a predefined threshold with respect to a predicted distance between GNSS satellite 420*a* and SBAS satellite 430*a*. In another example, a spoofing alert is output when a current computed range from GNSS satellite 420*a* to a GNSS satellite 420*b* is greater than a predefined threshold with respect to a predicted distance between GNSS satellite 420*a* and GNSS satellite 420*b*.

If a spoofer changes the SBAS satellite position, then it will be directly caught in a first step by the known position of the SBAS satellite. If the spoofer changes GNSS satellite positions without changing the SBAS satellite position, then this change will be caught in a second step of the validation. If the spoofer changes the GNSS and SBAS satellite positions together, then this change will be caught by prediction positioning from past ephemeris data for both GNSS and SBAS satellites.

The SBAS and GNSS satellite orbital information is also seamlessly available from IGS when seamlessly connected to ground through 4G/5G, Satcom communication links, etc., which facilitates computation of distance information between the satellites. This data can be directly used for comparing the distance computed out of the received GNSS/SBAS signal. In addition, UAM vehicles, UAS vehicles, and drones, which can be seamlessly connected to ground through modern communication links, can benefit from the present approach.

Also, in the future, when an aircraft is close to an airport, the aircraft will be able to access IGS data through connected communication links (e.g. 5G, Satcom, etc.). Thus, aircraft at lower altitudes (e.g., less than about 2 km) can benefit from the present GNSS spoofing detection techniques.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for detecting satellite signal spoofing, the method comprising: monitoring a plurality of satellite signals, from Global Navigation Satellite System (GNSS) satellites and Satellite-based Augmentation System (SBAS) satellites, with a GNSS receiver; obtaining a current time and satellite orbital parameters from the GNSS receiver, based on real-time satellite signals received from the GNSS and SBAS satellites through a GNSS antenna; computing satellite orbital positions for the GNSS and SBAS satellites based on the current time and satellite orbital parameters from the GNSS receiver; retrieving past satellite orbital parameters from the GNSS receiver stored in a memory; calculating predicted satellite orbital positions for the GNSS and SBAS satellites based on the satellite orbital parameters with respect to the current time, and the past satellite orbital parameters stored in the memory; computing current satellite orbital positions for the GNSS and SBAS satellites based on current satellite signals from the GNSS and SBAS satellites received by the GNSS receiver; determining at least one first distance value between two or more of the GNSS and/or SBAS satellites based on the predicted satellite orbital positions; determining at least one second distance value between two or more of the GNSS and/or SBAS satellites based on the current satellite orbital positions; comparing the at least one first distance value and the at least one second distance value to obtain at least one discriminator value; determining whether the at least one discriminator value is greater than a threshold level; and outputting a spoofing alert signal when the at least one discriminator value is greater than the threshold level.

Example 2 includes the method of Example 1, further comprising: determining whether the past satellite orbital parameters were updated at a time greater than a time period threshold; and if the past satellite orbital parameters were updated at a time greater than the time period threshold, then collecting real-time satellite orbital information for the GNSS and SBAS satellites from the GNSS receiver, and storing the real-time satellite orbital information in the memory.

Example 3 includes the method of Example 2, wherein the past satellite orbital parameters are updated and stored for different timelines in separate storage locations of the memory.

Example 4 includes the method of any of Examples 1-3, wherein the at least one first distance value and the at least one second distance value are determined by distance information comprising: distance information between the GNSS and SBAS satellites; distance information between a GNSS satellite and one or more other GNSS satellites; or distance information between multiple GNSS satellites of different constellations.

Example 5 includes the method of any of Examples 1-4, wherein the GNSS receiver is located in a vehicle comprising an aerial vehicle, a land vehicle, or a sea vehicle.

Example 6 includes the method of any of Examples 1-4, wherein the GNSS receiver is located in an aerial vehicle comprising a manned aircraft, a helicopter, an unmanned aerial vehicle (UAV), an unmanned aircraft system (UAS) vehicle, an urban air mobility (UAM) vehicle, or a drone.

Example 7 includes the method of any of Examples 1-6, wherein the GNSS satellites comprise Global Positioning System (GPS) satellites, GALILEO satellites, BEIDOU satellites, GLONASS satellites, or combinations thereof.

Example 8 includes the method of any of Examples 1-7, wherein the SBAS satellites comprise Wide Area Augmentation System (WAAS) satellites, European Geostationary Navigation Overlay Service (EGNOS) satellites, GPS-Aided GEO Augmented Navigation (GAGAN) satellites, Multi-functional Satellite Augmentation System (MSAS) satellites, System for Differential Corrections and Monitoring (SDCM) satellites, or combinations thereof.

Example 9 includes the method of any of Examples 1-8, wherein the spoofing alert signal is sent to a cockpit display to notify a pilot of spoofing detection.

Example 10 includes the method of any of Examples 1-8, wherein the spoofing alert signal is made available for broadcast to other users that are airborne or on ground.

Example 11 includes a system comprising: at least one processor onboard a vehicle; a Global Navigation Satellite System (GNSS) receiver onboard the vehicle and operatively coupled with the at least one processor; and a GNSS spoofing detection module onboard the vehicle, the GNSS spoofing detection module including instructions to perform a method comprising: monitoring a plurality of satellite signals, from GNSS satellites and Satellite-based Augmentation System (SBAS) satellites, with the GNSS receiver; obtaining a current time and satellite orbital parameters from the GNSS receiver, based on real-time satellite signals received from the GNSS and SBAS satellites through a GNSS antenna; computing satellite orbital positions for the GNSS and SBAS satellites based on the current time and satellite orbital parameters from the GNSS receiver; retrieving past satellite orbital parameters from the GNSS receiver stored in a memory; calculating predicted satellite orbital positions for the GNSS and SBAS satellites based on the satellite orbital parameters with respect to the current time, and the past satellite orbital parameters stored in the memory; computing current satellite orbital positions for the GNSS and SBAS satellites based on current satellite signals from the GNSS and SBAS satellites received by the GNSS receiver; determining at least one first distance value between two or more of the GNSS and/or SBAS satellites based on the predicted satellite orbital positions; determining at least one second distance value between two or more of the GNSS and/or SBAS satellites based on the current satellite orbital positions; comparing the at least one first distance value and the at least one second distance value to obtain at least one discriminator value; determining whether the at least one discriminator value is greater than a threshold level; and outputting a spoofing alert signal when the at least one discriminator value is greater than the threshold level.

Example 12 includes the system of Example 11, wherein the GNSS spoofing detection module includes further instructions to perform the method, comprising: determining whether the past satellite orbital parameters were updated at a time greater than a time period threshold; and if the past satellite orbital parameters were updated at a time greater than the time period threshold, then collecting real-time satellite orbital information for the GNSS and SBAS satellites from the GNSS receiver, and storing the real-time satellite orbital information in the memory.

Example 13 includes the system of any of Examples 11-12, wherein the vehicle comprises a manned aircraft, a helicopter, an unmanned aerial vehicle (UAV), an unmanned aircraft system (UAS) vehicle, an urban air mobility (UAM) vehicle, or a drone.

Example 14 includes the system of any of Examples 11-13, wherein the GNSS satellites comprise Global Positioning System (GPS) satellites, GALILEO satellites, BEIDOU satellites, GLONASS satellites, or combinations thereof.

Example 15 includes the system of any of Examples 11-14, wherein the SBAS satellites comprise Wide Area Augmentation System (WAAS) satellites, European Geostationary Navigation Overlay Service (EGNOS) satellites, GPS-Aided GEO Augmented Navigation (GAGAN) satellites, Multi-functional Satellite Augmentation System (MSAS) satellites, System for Differential Corrections and Monitoring (SDCM) satellites, or combinations thereof.

Example 16 includes the system of any of Examples 11-15, wherein the at least one processor includes a standalone processor that hosts the GNSS spoofing detection module.

Example 17 includes the system of any of Examples 11-15, wherein the GNSS spoofing detection module is hosted by the GNSS receiver.

Example 18 includes the system of any of Examples 11-15, wherein the at least one processor is in a flight management system (FMS) of an aircraft, wherein the FMS hosts the GNSS spoofing detection module.

Example 19 includes the system of any of Examples 11-18, wherein the spoofing alert signal is sent to a cockpit display to notify a pilot of spoofing detection.

Example 20 includes the system of any of Examples 11-18, wherein the spoofing alert signal is made available for broadcast to other users that are airborne or on ground.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method for detecting satellite signal spoofing, the method comprising:
- monitoring a plurality of satellite signals, from Global Navigation Satellite System (GNSS) satellites and Satellite-based Augmentation System (SBAS) satellites, with a GNSS receiver;
- obtaining a current time and satellite orbital parameters from the GNSS receiver, based on real-time satellite signals received from the GNSS and SBAS satellites through a GNSS antenna;
- computing satellite orbital positions for the GNSS and SBAS satellites based on the current time and satellite orbital parameters from the GNSS receiver;
- retrieving past satellite orbital parameters from the GNSS receiver stored in a memory;
- calculating predicted satellite orbital positions for the GNSS and SBAS satellites based on the satellite orbital parameters with respect to the current time, and the past satellite orbital parameters stored in the memory;
- computing current satellite orbital positions for the GNSS and SBAS satellites based on current satellite signals from the GNSS and SBAS satellites received by the GNSS receiver;
- determining at least one first distance value between two or more of the GNSS and/or SBAS satellites based on the predicted satellite orbital positions;
- determining at least one second distance value between two or more of the GNSS and/or SBAS satellites based on the current satellite orbital positions;
- comparing the at least one first distance value and the at least one second distance value to obtain at least one discriminator value;
- determining whether the at least one discriminator value is greater than a threshold level; and
- outputting a spoofing alert signal when the at least one discriminator value is greater than the threshold level;
- wherein the at least one first distance value and the at least one second distance value are determined by distance information comprising:
  - distance information between the GNSS and SBAS satellites;
  - distance information between a GNSS satellite and one or more other GNSS satellites; or
  - distance information between multiple GNSS satellites of different constellations.

2. The method of claim 1, further comprising:

determining whether the past satellite orbital parameters were updated at a time greater than a time period threshold; and if the past satellite orbital parameters were updated at a time greater than the time period threshold, then collecting real-time satellite orbital information for the GNSS and SBAS satellites from the GNSS receiver, and storing the real-time satellite orbital information in the memory.

3. The method of claim 2, wherein the past satellite orbital parameters are updated and stored for different timelines in separate storage locations of the memory.

4. The method of claim 1, wherein the GNSS receiver is located in a vehicle comprising an aerial vehicle, a land vehicle, or a sea vehicle.

5. The method of claim 1, wherein the GNSS receiver is located in an aerial vehicle comprising a manned aircraft, a helicopter, an unmanned aerial vehicle (UAV), an unmanned aircraft system (UAS) vehicle, an urban air mobility (UAM) vehicle, or a drone.

6. The method of claim 1, wherein the GNSS satellites comprise Global Positioning System (GPS) satellites, GALILEO satellites, BEIDOU satellites, GLONASS satellites, or combinations thereof.

7. The method of claim 1, wherein the SBAS satellites comprise Wide Area Augmentation System (WAAS) satellites, European Geostationary Navigation Overlay Service (EGNOS) satellites, GPS-Aided GEO Augmented Navigation (GAGAN) satellites, Multi-functional Satellite Augmentation System (MSAS) satellites, System for Differential Corrections and Monitoring (SDCM) satellites, or combinations thereof.

8. The method of claim 1, wherein the spoofing alert signal is sent to a cockpit display to notify a pilot of spoofing detection.

9. The method of claim 1, wherein the spoofing alert signal is made available for broadcast to other users that are airborne or on ground.

10. A system comprising:

at least one processor onboard a vehicle;

a Global Navigation Satellite System (GNSS) receiver onboard the vehicle and operatively coupled with the at least one processor; and a GNSS spoofing detection module onboard the vehicle, the GNSS spoofing detection module including instructions to perform a method comprising:

monitoring a plurality of satellite signals, from GNSS satellites and Satellite-based Augmentation System (SBAS) satellites, with the GNSS receiver;

obtaining a current time and satellite orbital parameters from the GNSS receiver, based on real-time satellite signals received from the GNSS and SBAS satellites through a GNSS antenna;

computing satellite orbital positions for the GNSS and SBAS satellites based on the current time and satellite orbital parameters from the GNSS receiver;

retrieving past satellite orbital parameters from the GNSS receiver stored in a memory;

calculating predicted satellite orbital positions for the GNSS and SBAS satellites based on the satellite orbital parameters with respect to the current time, and the past satellite orbital parameters stored in the memory;

computing current satellite orbital positions for the GNSS and SBAS satellites based on current satellite signals from the GNSS and SBAS satellites received by the GNSS receiver;

determining at least one first distance value between two or more of the GNSS and/or SBAS satellites based on the predicted satellite orbital positions;

determining at least one second distance value between two or more of the GNSS and/or SBAS satellites based on the current satellite orbital positions;

comparing the at least one first distance value and the at least one second distance value to obtain at least one discriminator value;

determining whether the at least one discriminator value is greater than a threshold level; and outputting a spoofing alert signal when the at least one discriminator value is greater than the threshold level;

wherein if a spoofer changes a SBAS satellite orbital position, then the changed SBAS satellite orbital position will be detected in a first validation step using the predicted satellite orbital position of the SBAS satellite;

wherein if the spoofer changes a GNSS satellite orbital position without changing the SBAS satellite orbital position, then the changed GNSS satellite orbital position will be detected in a second validation step using the predicted satellite orbital position of the GNSS satellite;

wherein if the spoofer changes the GNSS and SBAS satellite orbital positions together, then the changed GNSS and SBAS satellite orbital positions will be detected by prediction positioning using past ephemeris data for both the GNSS and SBAS satellites.

11. The system of claim 10, wherein the GNSS spoofing detection module includes further instructions to perform the method, comprising:

determining whether the past satellite orbital parameters were updated at a time greater than a time period threshold; and if the past satellite orbital parameters were updated at a time greater than the time period threshold, then collecting real-time satellite orbital information for the GNSS and SBAS satellites from the GNSS receiver, and storing the real-time satellite orbital information in the memory.

12. The system of claim 10, wherein the vehicle comprises a manned aircraft, a helicopter, an unmanned aerial vehicle (UAV), an unmanned aircraft system (UAS) vehicle, an urban air mobility (UAM) vehicle, or a drone.

13. The system of claim 10, wherein the GNSS satellites comprise Global Positioning System (GPS) satellites, GALILEO satellites, BEIDOU satellites, GLONASS satellites, or combinations thereof.

14. The system of claim 10, wherein the SBAS satellites comprise Wide Area Augmentation System (WAAS) satellites, European Geostationary Navigation Overlay Service (EGNOS) satellites, GPS-Aided GEO Augmented Navigation (GAGAN) satellites, Multi-functional Satellite Augmentation System (MSAS) satellites, System for Differential Corrections and Monitoring (SDCM) satellites, or combinations thereof.

15. The system of claim 10, wherein the at least one processor includes a standalone processor that hosts the GNSS spoofing detection module.

16. The system of claim 10, wherein the GNSS spoofing detection module is hosted by the GNSS receiver.

17. The system of claim 10, wherein the at least one processor is in a flight management system (FMS) of an aircraft, wherein the FMS hosts the GNSS spoofing detection module.

18. The system of claim 10, wherein the spoofing alert signal is sent to a cockpit display to notify a pilot of spoofing detection.

19. The system of claim 10, wherein the spoofing alert signal is made available for broadcast to other users that are airborne or on ground.

* * * * *